April 27, 1954     E. H. FLETCHER     2,676,686
CLUTCH WITH LUBRICATING DEVICE
Filed Nov. 21, 1952     3 Sheets-Sheet 1

INVENTOR
EDWARD H. FLETCHER
BY
ATTORNEYS

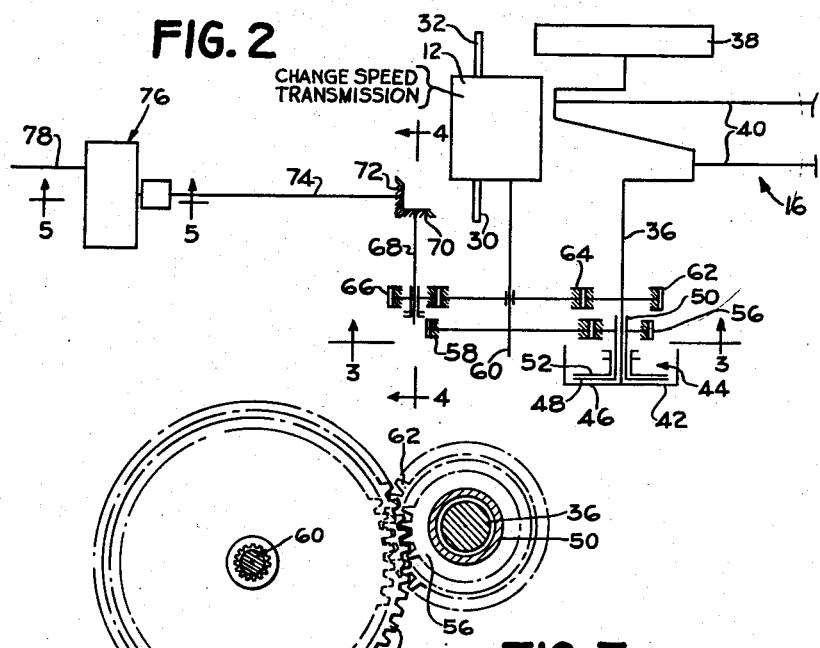

April 27, 1954

E. H. FLETCHER 2,676,686

CLUTCH WITH LUBRICATING DEVICE

Filed Nov. 21, 1952

*INVENTOR*
EDWARD H. FLETCHER
BY
*ATTORNEYS*

Patented Apr. 27, 1954

2,676,686

UNITED STATES PATENT OFFICE 2,676,686

CLUTCH WITH LUBRICATING DEVICE

Edward H. Fletcher, Cedar Falls, Iowa, assignor to Deere Manufacturing Co., Dubuque, Iowa, a corporation of Iowa Application November 21, 1952, Serial No. 321,925

6 Claims. (Cl. 192—113)

This invention relates to driving mechanism and more particularly to clutch-controlling means therefor. Still more particularly the invention relates to a power take-off driving mechanism for a vehicle such as an agricultural tractor.

Heretofore, most agricultural tractors were equipped, either optionally or regularly, with power take-off shafts for driving implements used with the tractors. These shafts were normally gear-connected to the tractor transmission and as long as the tractor clutch was engaged, the associated implement parts would be driven. More recently, the industry has experienced the development of a so-called continuous power take-off shaft, differing from that heretofore known primarily because the power take-off shaft is direct-connected to the engine. In other words, the newer power take-off shaft power train by-passes the transmission so that disengagement of the engine clutch does not cause simultaneous cessation of operation of the power take-off shaft. Fundamentally, of course, the so-called continuous or "live" power take-off shaft is not new. Nevertheless, there is considerable room for improvements in adapting the principle to modern agricultural tractors.

Inasmuch as the live power shaft is operative independently of the engine clutch in the vehicle or tractor, it is desired that it be equipped with its own clutch. Because of the necessity for constant engagement and disengagement, this clutch must be particularly well designed to stand up under long usage. It is also important that the power train incorporate means for accommodating temporary or sustained overloading so as to prevent damage to the power train or vehicle. Accordingly, it is desired that a clutch of the friction type be used in the power train to the power take-off shaft. Other design characteristics peculiar to a power train of this type have been gained from long experience. According to the present invention, there are provided improvements in the arrangement and the association of the clutch with the power take-off parts.

The primary object of the invention is to provide an improved power take-off of the character referred to above, and particularly to improve the clutch means therein. One feature of the invention is the utilization of yieldable means backing up the clutch so that the clutch may yield in response to temporary or sustained overloads. Another feature of the invention resides in means for efficiently circulating oil through a multiple disk-type clutch. As to this phase of the invention, it is a feature to closely associate a circulating pump with the input shaft for the power take-off.

The foregoing and other important objects inherent in and encompassed by the invention will become apparent from the following detailed description and accompanying sheets of drawings, all pertaining to a preferred embodiment of the invention.

In the drawings:

Figure 2 is a schematic plan view showing the power train from the tractor engine to the power take-off shaft.

Figure 3 is an enlarged fragmentary view as seen substantially along the line 3—3 of Figure 2.

Figure 4 is a still further enlarged transverse section as seen along the line 4—4 of Figure 2.

Figures 1, 6:
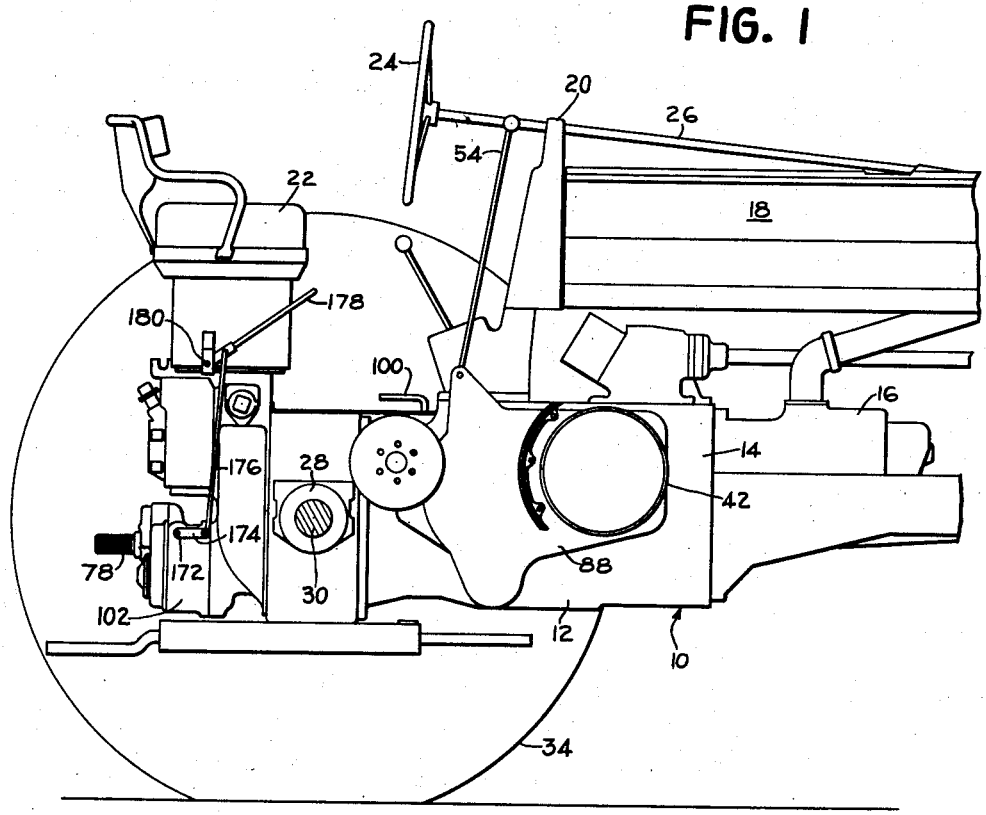
Figure 1 is a side elevational view of a rear portion of a tractor, with the right-hand rear wheel omitted to expose the tractor body and associated power take-off housing.
Figure 6 is a transverse fragmentary sectional view as seen along the line 6—6 of Figure 5.

The tractor illustrated in part in Figure 1 may be considered representative of a well-known type of agricultural tractor comprising a longitudinal body 10 having its rear portion formed of a final drive case or housing 12 of which the forward portion comprises a crankcase 14 for an internal combustion engine 16. Above the engine 16 is a fuel tank and hood structure 18 which is supported at its rear end in a standard 20 located somewhat conventionally ahead of an operator's seat 22. A steering wheel 24 for the tractor front wheels (not shown) is carried on a steering shaft 26 that is journaled in the upper portion of the standard 20. The operator's seat 22 is located over a rear part of the final drive case 12, which case includes laterally outwardly extending axle housing portions 28 (only one of which is shown) and in which are respectively journaled right- and left-hand drive axles 30 and 32 (Figure 2). A traction wheel 34 is keyed to the left-hand axle 32 and a similar traction wheel (omitted from the drawings) is keyed to the right-hand axle 30.

The particular tractor shown is basically similar to that disclosed in the U. S. patent to McCray 1,957,221. In such tractor, the engine crankshaft, shown here at 36 in Figure 2, is transverse to the length of the tractor body 10 and has keyed to its left-hand end a conventional flywheel 38. The engine is of the two-cylinder type in which the pistons reciprocate fore and aft. Connecting rods are shown schematically at 40 in Figure 2.

To the right-hand end of the crankshaft 36 is keyed a belt pulley 42 (Figures 1 and 2) and this belt pulley is associated in a manner not heretofore unknown with an engine or main clutch designated generally by the numeral 44. In its simplest form, this clutch includes the radial face of the belt pulley 42 as a clutch face 46, a clutch plate 48 keyed to a sleeve 50 journaled on the crankshaft 36 and a shiftable pressure plate 52 controlled in any suitable manner by a clutch control lever 54 (Figure 1).

A transmission input or driving gear 56 is keyed to or formed integrally with the clutch sleeve 48 and is in constant mesh with a transmission driven gear 58. This driven gear is keyed to a transmission input shaft 60, which enters the right-hand side of the final drive or transmission case and delivers input power to a change speed gear set of any conventional type. This transmission mechanism has been illustrated only schematically (Fig. 2) since the details thereof form no part of the present invention.

As long as the main or engine clutch 44 is disengaged, as shown in Figure 2, the crankshaft 36 rotates without transmitting any power to the transmission mechanism in the final drive case 12. Accordingly, there will be no forward progress of the tractor, since the drive axles 30 and 32 do not receive power from the engine. However, when the clutch is engaged, the transmission input gear 56 is driven through the clutch and transmits power to the transmission via the transmission driven gear 58 and input shaft 60. Selection of a suitable gear combination in the transmission will, of course, cause the engine 16 to drive the axles 30 and 32.

A power take-off input gear 62 is keyed to the right-hand end portion of the crankshaft 36 and lies closely alongside the transmission driving or input gear 56. The power take-off gear 62 is in constant mesh with a power take-off driven gear 64 that is journaled on the transmission input shaft 60 closely alongside the transmission driven gear 58. The gears 62 and 64 are driven at all times as long as the crankshaft 36 is rotating, irrespective of whether or not the main clutch 44 is engaged.

A sliding pinion 66, constrained for rotation with but axially shiftable on a power take-off transfer shaft 68 may be selectively engaged with or disengaged from the power take-off driven gear 64. The shaft 68 has keyed thereto a bevel pinion 70 which is in constant mesh with a bevel pinion 72 keyed to a longitudinally running power take-off transfer shaft 74. The shaft 74 has its terminal end connected by means of a clutch, designated for the present by the numeral 76, to the ultimate power take-off shaft 78. The details of this arrangement will be described below.

As shown in Figure 4, the transmission or final drive casing 12 has a bottom or floor 80 and a right-hand upright side wall 82. This wall is provided at a lower portion thereof with a suitable antifriction bearing 84 for journaling one end portion of the transverse shaft 68. The inner end of the shaft is journaled in a bearing 86 in an integral upstanding portion of the casing floor 80. The right-hand end of the shaft (left-hand end as viewed in Figure 4) extends outwardly of the wall 82 and is splined at 88 to slidably carry the gear 66 thereon. The gear 66 and the gears 58, 64, 56 and 62 are enclosed at the right-hand side of the tractor by an auxiliary casing 88.

The hub of the gear 66 is provided, as is generally conventional, with an annular collar 90 with which a shifter fork 92 is cooperative. This fork is carried at one end of a shifter shaft 94 which extends through the casing wall 82 to a controllable connection with an arm 96 at the lower end of a shifter control rod 98. This rod projects upwardly through the top of the casing and has a handle 100 (Figure 1) by means of which the operator may readily engage or disengage the pinion 66 and gear 64. In normal operation—that is, when the tractor is used with an implement to be driven by the power take-off shaft 78—the pinion 66 will be in constant mesh with the driven gear 64. In those cases in which the tractor is used alone or with an implement having no driven parts, the pinion 66 may be disengaged to save wear on the power take-off shaft and the parts that make up its power-transmitting train.

The power take-off unit itself may be considered an attachment, since it may be furnished with the tractor as regular equipment or as optional equipment. In any event, the clutch 76, previously described in connection with the schematic illustration in Figure 2, is enclosed in a power take-off casing or housing designated generally by the numeral 102. This housing has a front wall 104 through which the rear end of the longitudinal power take-off transfer shaft 74 extends. Insofar as concerns the final part of the power train between the shaft 74 and the shaft 78, the shaft 74 may be considered a driving shaft.

The driving shaft 74 is flanged at 106 at its rear end and is rigidly secured to the radial portion of a rearwardly facing coaxial cup- or bell-shaped member 108. The portion of the shaft 74 adjacent the member 108 is appropriately journaled in a bearing 110 in a sleeve portion 112 of the casing 102 which spaces the wall 104 of the casing 102 forwardly from a second wall 114. The clutch 76 is located rearwardly of the second wall 114 and is of the multiple-disk type comprising a plurality of alternating driving and driven disks 116 and 118. The driving disks 116 are keyed at their outer peripheries to the cylindrical portion of the bell-shaped member 108. The driven disks 118 are keyed at their inside diameters to a driven shaft 120 that is coaxial with the driving shaft 74. The rear end of the driving shaft 74 is recessed and provided with a pilot bearing 122 in which is journaled the forward reduced end of the driven shaft 120.

The rear end of the driven shaft 120 is appropriately journaled at 124 in a bearing in a rear wall 126 of the casing 102. A driving pinion 128 is keyed to that portion of the driven shaft just forwardly of the bearing 124. This gear or pinion is in constant mesh with a power take-off shaft output gear 130. The gear 130 is keyed to the inner end of the power take-off shaft 78, the shaft 78 extending rearwardly through the rear wall 126 of the casing 102 for ready access to connection with implements used with the tractor.

Figure 5:
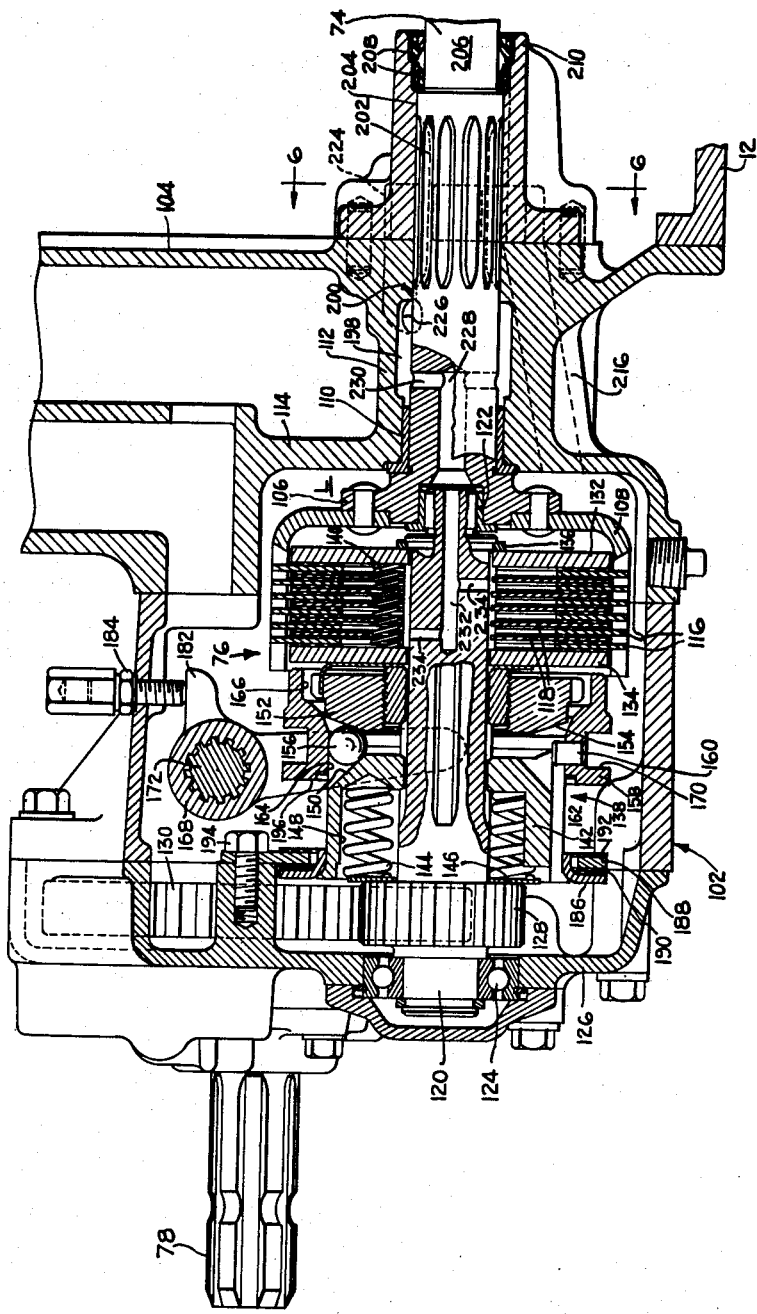
Figure 5 is a longitudinal sectional view, on the scale of Figure 4, as seen along the line 5—5 of Figure 2.

The clutch 76 is engaged by means of compressing the disks 116 and 118 between a pair of clutch plates 132 and 134. These plates or members are slidable on the driven shaft 120 by means of the splines that form the keyed connections with the driven disks 118. The forward member 132 is held against forward displacement by a snap ring 136. The rearward member may be considered an operating member and is under control of an actuator device designated generally by the numeral 138. The clutch includes springs 140 (only one of which is shown), which comprise first biasing means for normally spreading the members 132 and 134 so that the clutch is normally disengaged. The pinion 128 that is keyed to the rear end portion of the driven shaft 120 serves as abutment means between which and the operating member 134 the actuator device 138 functions. The actuator device comprises a reaction member 142 keyed to and axially slidable on the splined driven shaft 120. This reaction member is capable of being spring-loaded by second biasing means comprising a plurality of compression springs 144, so that the bias is to the right as seen in Figure 5, or in a direction tending to compress the disks in the clutch 76. The springs 144 seat against an annular member in the form of a washer 146 which in turn abuts the front face of the gear or pinion 128. Each of the springs 144 is received in a bore 148 having its axis parallel to the axis of the driven shaft 120 and the forward ends of the springs seat respectively in the front ends of the bores 148. From this, it will be seen that the reaction member 142 is recessed at its rear to receive the springs 144; and it has a front face 150 which forms one of a pair of cooperative cam surfaces for exerting thrust on the clutch 76 to compress the disks 116 and 118. A second member 152 is slidably keyed on the splined driven shaft 120 and is interposed between the cam face 150 of the reaction member 142 and the rear or left-hand face of the operating member 134. The member 152 is made up of several parts but the details are not important here. Therefore, it will be considered as being a single member. The rear face of the member 152 provides the second of the cooperating cam surfaces, designated by the numeral 154.

A plurality of balls 156 (only one of which is shown) is cooperative between the cam faces 150 and 154 for spreading the members 142 and 152 axially apart to compress the disks in the clutch 76. The position of the balls is determined by a control ring 158 that encircles the reaction member 142 and its component member 152. The control ring 158 is slidable on but constrained for rotation with the reaction member 142 by means of a pin 160 that operates in a keyway 162 in the reaction member 142.

The ring 158 has in effect two inside diameters of different sizes. The first diameter portion, designated by the numeral 164, is smaller than a second diameter portion 166. Consequently, when the control ring 158 is moved to its forward position as shown in Figure 5, the balls 156 are forced between the cam faces 150 and 154 and are maintained in that position as long as the control ring is in its forward position. Since the diameter of each of the balls is greater than the axial distance between the members 142 and 152, the members are spread axially and the clutch disks 116 and 118 are compressed against the first biasing means or clutch springs 140. This results because the second biasing means, comprising the compression springs 144, is materially stronger than the springs 140, and when the clutch is fully engaged, the springs 144 are not fully compressed. Consequently, the clutch is not backed up positively but is backed up yieldingly by the springs 144. Therefore, should a temporary or sustained overload occur on the power take-off shaft 78, the springs 144 can yield sufficiently to permit the disks 116 and 118 to slip. Such slipping will, of course, prevent damage to the other parts of the power train.

When the control ring 158 is moved in the opposite direction (to the left as viewed in Figure 5), the balls are released because of the increased diameter of the diameter portion 166. That is to say, the balls escape from the limited space between the cam faces 150 and 154 on the members 142 and 152, and these members move toward each other to relax the pressure on the clutch disks.

The actuator device 138 and its control ring 158 thus comprise bi-positional control means acting on the operating member 134 and effective in one position to exert thrusting forces in opposite directions for spreading the members 142 and 134 axially apart against their respective biasing means 144 and 142 to engage the clutch and effective in a second position to relieve the members of the thrust forces so that the members may be returned by their respective biasing means to their neutral or normal positions in which the clutch 76 is disengaged.

The control ring 158 is actuated between its two positions by a control fork 168, of conventional construction, that engages an annular external groove 170 in the ring 158. The control fork 168 is keyed to a short transverse rock-shaft 172 that extends exteriorly at the right-hand side of the power take-off casing 102 for connection to a forwardly extending arm 174. The forward end of this arm is connected by an actuating link 176 to a control lever 178 pivoted at 180 within easy reach of an operator on the operator's seat 22. The control fork further includes interiorly of the casing 102 a forwardly extending short arm 182 which abuts an adjustable screw 184 carried by the top wall of the casing 102. When the arm 182 engages the internal end of the screw 184, the maximum or engaged position of the control ring 158 is determined.

When the control ring is moved in the opposite direction, the opposing pressures of the two sets of compression springs 140 and 144, plus centrifugal force, compel the balls 156 outwardly to be confined by the larger diameter portion 166 of the ring. The balls in this position serve as detents to prevent accidental movement of the ring 158 to its clutch-engaged position; although, these "detents" may be easily overcome by pressure exerted by the operator on the control lever 178. The clutch 76 is disengaged by downward pressure applied to the operating lever 178.

The details of the actuator device 138 are not broadly new and actuators of this type are known in various forms. The actuator shown differs primarily in that it is backed up by the yieldable means or springs 144 instead of acting against a fixed abutment. In the case of fixed abutment, wear in the clutch plates ultimately results in slippage of the clutch. The springs 144 are, of course, calculated to prevent slippage during normal conditions and expand as the clutch plates wear, eliminating the need for frequent adjustment. At the same time, the pressure of the springs 144 in the clutch may be relatively light so as to enable the clutch to slip under excessive loads, whereas the yieldably backed up reaction member such as at 142 serves to maintain engagement of the clutch 76 during normal operation but permits slippage due to overload.

The springs 144 serve an additional function, not heretofore known in prior actuator devices. As will be seen in Figure 5, in which figure the clutch 76 is engaged, the reaction member 142 has fixed thereto a flanged ring 186 which, as will be hereinafter apparent, serves as a combined stop and brake element or portion. There is fixed to the rear wall 126 of the power take-off casing 102 a second cooperative stop or brake element or portion in the form of a ring 188 having its opposite radial faces provided respectively with brake material 190 and 192. When the clutch is engaged, as shown in Figure 5, the front radial face of the reaction member ring 186 is spaced rearwardly from the rear brake face 190 on the ring 188. When the control ring 158 is moved rearwardly to disengage the clutch, pressure on the balls 156 is released and, as stated above, the balls are free to escape from between the cam faces 150 and 154 into the confinement of the ring portion 166 of the ring 158. The springs 144 then urge the reaction member 142 forwardly but the forward movement thereof is limited because of engagement of the ring 186 with the brake face 190. Thus, cooperation between the parts 186 and 190 serves not only to limit forward movement of the actuator member 142 but retards the speed of rotation thereof, since the ring 186 is fixed to the reaction member 142 and the ring 188 is fixed to the housing or casing 102, as by a plurality of cap screws 194 (only one of which is shown).

In addition to the braking effect accomplished by the parts just described, a secondary brake may be resorted to by manual pressure downwardly on the clutch control lever 178. The rear face of the control ring 158 has a radial brake surface 196 that is normally axially spaced from the opposed brake face 192 on the ring 188. If the brake as applied at 186—190 is insufficient to retard the speed of rotation of the power take-off shaft 78 and whatever is connected to it, the ring 158 may be forced rearwardly under control of the operator so that the second brake is applied at 196—192. The two brakes in combination adequately accomplish effecting braking for most extreme operating conditions. The braking effectiveness at 186—190 accommodates normal operation.

In addition to the foregoing, the invention includes another feature that pertains to the circulation of lubricant through the multiple disk clutch 76. The interior of the casing 102 forms a compartment adapted to contain lubricant to substantially the level indicated by the line designated L in Figure 5. The facings on the clutch disks 116 and 118 are, of course, the kind adapted to operate in a lubricant bath.

The sleeve portion 112 of the housing 102, previously described, encircles the rear end portion of the driven shaft 74 just ahead of the bearing 110. The inner portion of the sleeve is enlarged so that a cavity 198 is formed about the shaft. This cavity is sealed at one end by the bearing 110 and at its other end by the outside diameter of the shaft 174 as designated generally by the numeral 200. Just ahead of the portion 200, the shaft 74 is splined at 202 to serve as a pump gear. The splines are of limited axial extent and terminate so as to leave a cylindrical outside diameter 204, ahead of which the shaft 74 is reduced at 206 to accommodate a pair of lubricant seals 208.

The lubricant seals 208 are established between the reduced portion 206 of the driving shaft 74 and an auxiliary housing 210 rigidly secured to the front face of the wall 104 of the casing 102. This wall forms a pump chamber 212 that encloses the pump gear or spline 202 and a pump idler gear 214. The formation of the pump gear 202 as a spline on the driving shaft 74 instead of as a separate gear permits the use of a smaller gear and cuts down the amount of space needed for the pump.

The pump chamber 212 is connected by a suction passage 216 to the lubricant sump provided at the lower portion of the clutch compartment. The suction passage enters the pump housing 210 and leads to a pump inlet 220. The outlet 222 of the pump is connected by a short passage 224 to the cavity 198 in the housing sleeve 112. The discharge end of the high-pressure passage 224 within the cavity 198 is visible at 226 in Figure 5.

The rear or terminal end of the driving shaft 74 has an axial bore or passage 228 therein. The inner or forward end of this bore or passage communicates with the cavity 198 via one or more radial passage portions 230, so that the inlet end of the bore 228 is in axially spaced relation to the clutch compartment. The rear or terminal end of the passage communicates across the pilot bearing 122 with an axial bore or passage 232 formed in the proximate end portion of the driven shaft 120. Axially offset radial passages 234 in the driven shaft 120 communicate the axial passage 232 with the interior of the clutch 76. Since the outside of the driven shaft 120 is longitudinally splined, as explained before, the passages 234 are in fluid transfer relationship with the clutch disks 116 and 118. Accordingly, the pump 202—214 circulates lubricant by drawing lubricant from the sump in the clutch compartment through the suction passage 216—218 and recirculates it through the high-pressure passage 224—226 and shaft passages 230, 228, 232, and 234 to the interior of the clutch.

The relationship of the pump to the clutch is one of compact organization and, although the two are closely related, they are separated by the housing portions so that either the clutch or the pump may be serviced without disturbing the other.

Various features of the invention in this respect and in other respects will, although not expressly enumerated herein, undoubtedly occur to those versed in the art, as likewise will many modifications and alterations in the preferred design illustrated, all of which may be achieved without departing from the spirit and scope of the appended claims.

What is claimed is:

1. Driving mechanism, comprising: a rotatable driving shaft having a terminal end; a driven shaft coaxial with the driving shaft and having a terminal end proximate to the terminal end of the driving shaft; bearing means journalling one shaft end on the other; a multiple-disk clutch coaxial with the shafts and having driving and driven disks keyed respectively to the shafts; the driven shaft having radial passage means therein opening to the clutch disks and an axial passage communicating with the radial passage means and opening at the terminal end of the driven shaft; the driving shaft having an axial passage therein opening at the terminal end of the driving shaft in communication with the driven shaft axial passage and extending into the driving shaft to an inlet opening spaced axially from the clutch, and exposed to the exterior of said driving shaft; housing means providing a compartment containing the clutch and at least the terminal ends of the shafts and adapted to contain lubricant at a predetermined level; a housing portion providing a pump chamber supported by the housing means and having a suction passage communicating with the compartment below the lubricant level and a high-pressure passage leading to the inlet opening in the driving shaft; and a lubricant pump in the pump chamber and driven by the driving shaft for drawing lubricant from the compartment through the suction passage and circulating such lubricant through the high-pressure passage and the shaft and passages and through the clutch disks for return to the compartment.

2. The invention defined in claim 1, in which: the pump is a gear pump comprising a first gear forming a circumferentially splined portion within the outside diameter of the driving shaft and a second gear mehing with the splined portion.

3. Driving mechanism, comprising: a rotatable driving shaft having a terminal end; a driven shaft coaxial with the driving shaft and having a terminal end proximate to the terminal end of the driving shaft; bearing means journalling one shaft end on the other; a multiple-disk clutch coaxial with the shafts and having driving and driven disks keyed respectively to the shafts; the driven shaft having radial passage means therein opening to the clutch disks and an axial passage communicating with the radial passage means and opening at the terminal end of the driven shaft; the driving shaft having an axial passage therein opening at the terminal end of the driving shaft in communication with the driven shaft axial passage and extending into the driving shaft to a radial inlet passage opening to the circumference of the driving shaft in axially spaced relation to the clutch; housing means providing a compartment containing the clutch and at least the terminal ends of the shafts and adapted to contain lubricant at a predetermined level; said housing means including a cavity with which said radial inlet passage communicates; a housing portion providing a pump chamber supported by the housing means and having a suction passage communicating with the compartment below the lubricant level and a high-pressure passage leading to the cavity; and a lubricant pump in the pump chamber and driven by the driving shaft for drawing lubricant from the compartment through the suction passage and circulating such lubricant through the high-pressure passage; the cavity and the shaft passages, and through the clutch for return to the compartment.

4. Driving mechanism, comprising: a rotatable driving shaft having a terminal end; a driven shaft coaxial with the driving shaft and having a terminal end proximate to the terminal end of the driving shaft; bearing means journalling one shaft end on the other; a multiple-disk clutch coaxial with the shafts and having driving and driven disks keyed respectively to the shafts; the driven shaft having radial passage means therein opening to the clutch disks and an axial passage communicating with the radial passage means and opening at the terminal end of the driven shaft; the driving shaft having an axial passage therein opening at the terminal end of the driving shaft in communication with the driven shaft axial passage and extending into the driving shaft to an inlet opening spaced axially from the clutch and exposed to the exterior of said driving shaft; a lubricant sump opening to the clutch; a lubricant pump driven by the driving shaft and including a suction conduit to the sump and a high-pressure passage to the driving shaft inlet opening.

5. Driving mechanism, comprising: a housing having an upright wall and a bottom providing an internal lubricant compartment; a driving shaft journaled by the housing and extending through the wall to have an internal end within the compartment and an external portion outside the compartment, said shaft having passage means therein including an inlet opening outside the compartment and an outlet opening at said internal end; a driven shaft journaled in the housing coaxially with the driving shaft and having one end proximate to the internal end of the driving shaft, said driven shaft having an axial passage means therein including an inlet opening at its driving-shaft-proximate end in fluid transfer communication with the driving shaft outlet and further including a radial outlet opening through the circumference of said driven shaft within the compartment; clutch means within the compartment and including selective engageable and disengageable clutch elements coaxial with and connected respectively to the shafts and arranged so that certain of said elements are exposed in fluid-receiving relationship to the radial outlet in the driven shaft; means outside the compartment providing a pump chamber surrounding the external portions of the driving shaft and having a suction passage leading through the housing wall to a lower part of the compartment and a high-pressure passage leading to the driving shaft inlet; and a lubricant pump in the chamber and driven by the driving shaft for drawing lubricant from the compartment via the suction passage and for circulating such lubricant through the shaft passage means to the clutch.

6. Driving mechanism, comprising: a housing having an upright wall and a bottom providing an internal lubricant compartment; a driving shaft journaled by the housing and extending through the wall to have an internal end within the compartment and an external portion outside the compartment, said shaft having passage means therein including an inlet opening radially to the circumference of the shaft outside compartment and an outlet opening axially at the internal end of the shaft; means on the housing outside the compartment and embracing the external portion of the shaft and providing a cavity surrounding the radial inlet and a pump chamber axially separate from the cavity and surrounding said external portion of the shaft; a driven shaft journaled in the housing coaxially with the driving shaft and having one end proximate to the internal end of the driving shaft, said driven shaft having an axial passage means therein including an inlet opening at its driving-shaft-proximate end in fluid-transfer communication with the driving shaft outlet and further including a radial outlet opening through the circumference of said driven shaft within the compartment; clutch means within the compartment and including selective engageable and disengageable clutch elements coaxial with and connected respectively to the shafts and arranged so that certain of said elements are exposed in fluid-receiving relationship to the radial outlet in the driven shaft; means providing a suction passage from the compartment to the pump chamber; means providing a high-pressure passage leading from the pump chamber to the aforesaid cavity; and a lubricant pump in the pump chamber and driven by the driving shaft for drawing lubricant from the compartment via the suction passage and for circulating such lubricant through the cavity and shaft passage means to the clutch.

References Cited in the file of this patent

UNITED STATES PATENTS

| Number | Name | Date |
|---|---|---|
| 1,702,116 | Hoffman | Feb. 12, 1929 |
| 1,928,301 | Pierson | Sept. 26, 1933 |
| 2,498,123 | Hobbs | Feb. 21, 1950 |
| 2,521,239 | McDowall et al. | Sept. 5, 1950 |

FOREIGN PATENTS

| Number | Country | Date |
|---|---|---|
| 276,063 | Great Britain | Aug. 17, 1927 |